Feb. 10, 1925.  1,526,260
G. VINNEMEIER
STEERING METER CONTROL MECHANISM
Filed March 1, 1924   2 Sheets-Sheet 2
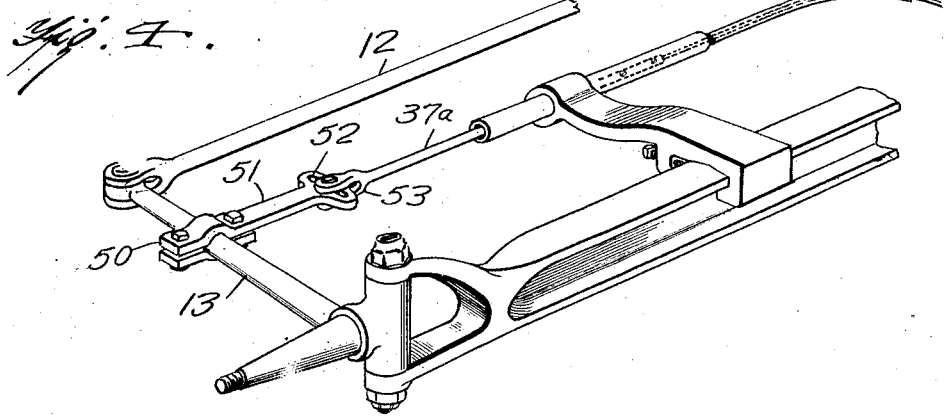
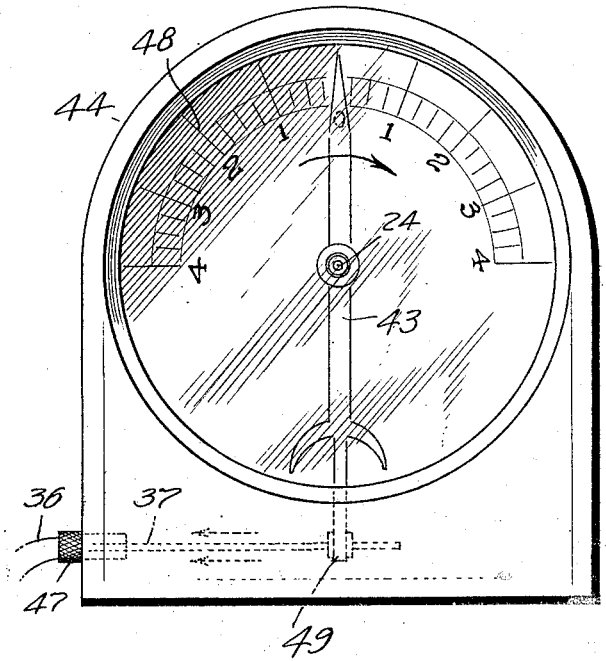
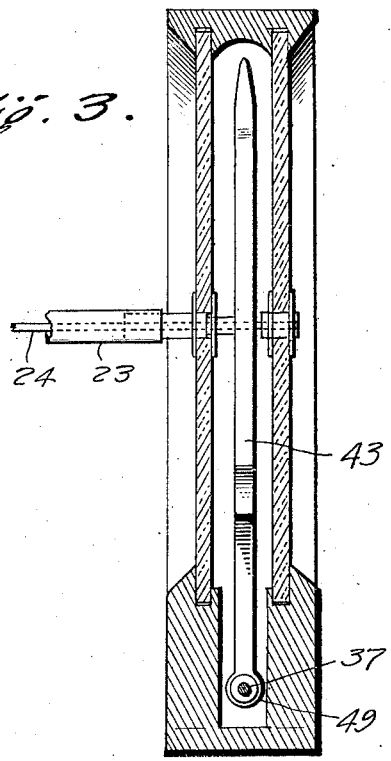
Inventor
G. VINNEMEIER,
By Watson E. Coleman
Attorney Patented Feb. 10, 1925.

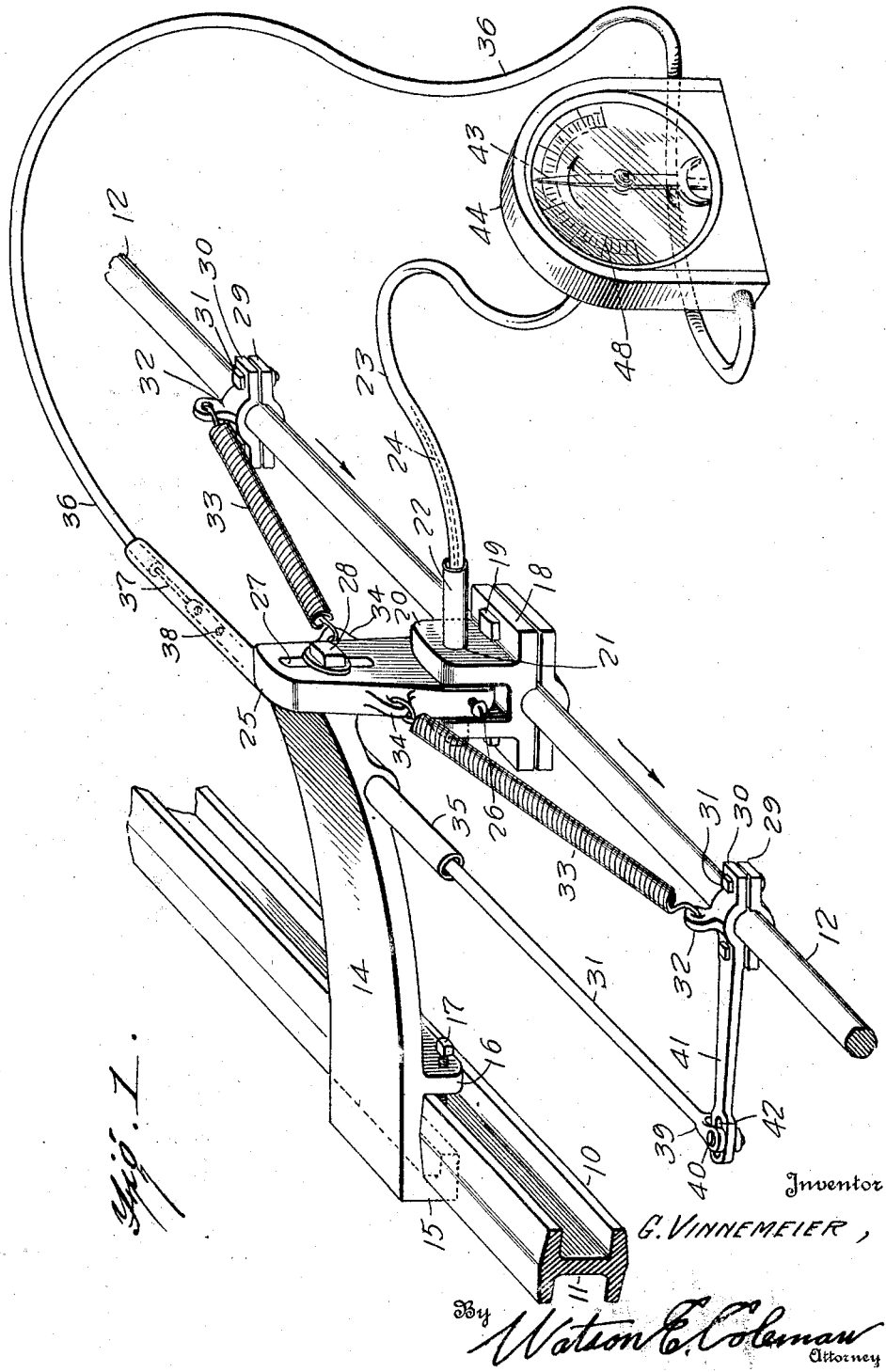

1,526,260

UNITED STATES PATENT OFFICE.

GERHARD VINNEMEIER, OF IOLA, KANSAS.

STEERING-METER CONTROL MECHANISM.

Application filed March 1, 1924. Serial No. 696,351.

*To all whom it may concern:*

Be it known that I, GERHARD VINNEMEIER, a citizen of the Republic of Germany, residing at Iola, in the county of Allen and State of Kansas, have invented certain new and useful Improvements in Steering-Meter Control Mechanism, of which the following is a specification, reference being had to the accompanying drawings.

This invention relates to steering meter control mechanism for vehicles and more particularly to control mechanism for a device for indicating the position of the steering wheels of automobiles.

An important object of the invention is to provide in combination with a device of this character means for maintaining the dirigible steering element in a position in which the vehicle travels in a straight line.

A further object of the invention is to provide in combination with a meter for indicating when the dirigible steering element is in the straight steering position a dual operating mechanism for the indicator of the meter so connected with the meter that vibration of this indicator and unsteady operation thereof, resulting from vibration of the machine and also slight deviations of the steering mechanism due to the same encountering obstructions, is eliminated and the indicator held steady in an approximate indicating position corresponding to the position of the steering mechanism.

A still further object of the invention is to provide a device of this character which may be readily applied to the present constructions of vehicles without in any manner altering the construction thereof, which may be very cheaply and readily produced and which will be durable and efficient in service.

These and other objects I attain by the construction shown in the accompanying drawings, wherein for the purpose of illustration is shown a preferred embodiment of my invention and wherein:—

Figure 1 is a perspective view showing steering meter operating mechanism constructed in accordance with my invention applied to the steering mechanism of a vehicle;

Figure 2 is a front elevation of the meter;

Figure 3 is a vertical sectional view through the meter;

Figure 4 is a perspective view showing an alternative manner of mounting the tube and operating member upon the steering mechanism.

Referring now more particularly to the drawings, the numeral 10 indicates the axle of a vehicle which axles, as well-known to those familiar with the art, are substantially I-shaped in cross section and provided in opposite faces thereof with channels 11. Rearwardly of the axle and paralleling the same is disposed a tie rod 12 connecting the steering spindle arms 13 by means of which the front or steering wheels of the vehicle are controlled. These parts are normal parts of the vehicle and are in no way claimed by me except in combination with the mechanism hereinafter described.

In accordance with my invention I provide an arm 14 having at its forward end a hook 15 the eye of which is adapted to engage in the channel 11 at the forward side of the axle 10. At a point spaced from the end of the arm, the arm is provided with a flange 16 confronting the opening of the hook 15, this arm having directed therethrough adjustable securing elements 17 which are adapted to engage in the channel 11 at the rear side of the axle, these securing elements being adjustable permit this arm to be attached to axles of varying thicknesses. This arm may be applied to either the upper or under surface of the axle 10 but is shown in the present instance as attached to the upper side thereof. The arm is of sufficient length to extend rearwardly to a point above and in approximate vertical alignment with the tie rod 12.

Arranged upon opposite faces of the tie rod are a pair of plates 18 the adjacent faces of which are grooved to receive the tie rod, the plates having securing elements 19 by means of which they may be drawn together to clamp upon the tie rod. The plate next adjacent the arm 15 has upstanding thereon a pair of vertical flanges 20 paralleling the tie rod and having formed therein openings 21 aligning longitudinally of the vehicle. Directed through the openings 21 is a tube 22 with which is engaged the end of the housing 23 of Bowden wire 24, the wire 24 projecting beyond the end of the housing and into the tube between the flanges 20. Upon the tube between the flanges 20 is mounted one end of a lever 25, the lever and tube having aligned openings, the opening of the lever being threaded and having mounted therein a set screw 26 which extends through the opening of the sleeve and engages the Bowden wire to hold the same against rotation with relation to the lever. The free end of the lever is provided with a longitudinally directed slot 27 through which extends a reduced portion of the arm 14 preferably provided by threading into the end of the arm a bolt 28.

Mounted upon the tie rod 12 in spaced relation to the plates 20 and accordingly in spaced relation to the lever 25 are mounted clamping yokes 29 each consisting of a pair of plates 30 having their adjacent faces grooved for the reception of the tie rod and provided with clamping securing elements 31 by means of which they may be bound in adjusted positions upon the tie rod. The plate 30 disposed at that side of the tie rod corresponding to the flanges 20 of the plate 18 in each instance is provided with an eye-32 to which is secured one end of a spring 33. The opposite ends of the spring 33 are secured to eyes 34 formed in opposite sides of the lever 25 in spaced relation to the pivoted end thereof. The clamping yokes 29 for a reason hereinafter apparent are preferably uniformly spaced from the plates 18 at opposite sides thereof.

Secured to the arm 14 and paralleling both the axle and the tie rod 12 is a tube 35 to one end of which is connected a second Bowden wire housing 36 containing a Bowden wire 36ª. The end of this wire projects into the tube 35 and within the tube is clamped to one end of a rod 37 as indicated at 38. The opposite end of this rod projects beyond the opposite end of the tube and is forked, as indicated at 39, and provided through the forks with a pivot pin 40. The yoke 29 at the side of the arm 14 corresponding to the forked end of the rod 37 is provided upon one of the plates thereof with a rigid extension 41 the end of which is provided with a longitudinal slot 42 through which the pivot pin 40 of the forked end 39 is directed. The meter employed in conjunction with this mechanism may be of any desired type in which the indicator 43 is provided with means for attaching the Bowden wire thereto at the pivot point and at or adjacent one end thereof. In the present instance I have illustrated a casing 44 provided in opposed side faces thereof with glass sheets 45 the centers of which have mounted therein pivot mountings 46 for the pointer 43. One of these pivot mountings likewise affords means for attaching thereto at the outside of the casing of the Bowden wire housing 23 and the wire 24 of this housing is directed through this pivot and secured to the pointer 43 at the pivot point thereof. Through a wall of the casing 44 in the plane of swing of the indicator 43 an opening 47 is formed in which the Bowden wire housing 36 is secured. The wire 36ª of this housing is extended into the casing and engaged with the end of the indicator 43 opposite to that coacting with the dial 48 of the meter, this end being generally indicated at 49. The dials 48 are preferably formed by engraving the faces of the glass plates 45 so that the dial proper will offer no resistance to view through the casing, it being preferred that these casings be so positioned that they may be visible to the driver without detracting his attention from the steering. This position will, of course, mean that unless the device is transparent view through the windshield would be obstructed.

In the operation of the device and during normal travel of the vehicle upon the road, the springs by their engagement with the lever 25 and since they they exercise a uniform effect thereon will tend to hold this lever in a vertical position and in positioning the apparatus upon the tie rod care is taken that the plates 19 are so positioned that when the lever 25 is in vertical position the steering wheels are in the straight ahead position and the meter reads at zero. Now, assuming a turn to the right is being made, the tie rod moves in the direction of the arrow or to the left, movement of the tie rod at all times being the reverse of the direction of the turn. This movement to the left causes the lever 25 to incline to the right, the degree of inclination depending upon the degree of turn. Since the Bowden wire 24 is fixed to the lever at the pivot thereof and is rotated by the oscillation of this lever, the oscillation of the lever is imparted to the pointer 43, the pointer moving in the direction of the arrow in Figure 2. The inclination of the lever 25 causes the tension of the spring to the right of the lever to be relieved and the tension of the spring to the left of the lever to be increased with the result that the last named spring tends to restore the lever to its normal position and will restore the lever to its normal position and accordingly the tie rod to the position in which the wheels are straight ahead after the steering wheels are released. At the same time the rod 37 moving with the tie rod draws the Bowden wire 36ª through its housing 36 and causes movement of the lower end 49 of the indicator pointer 43 in the direction of the arrow in Figure 1. Thus a double connection between the steering mechanism and the meter is obtained which prevents any tendency of the pointer 43 to vibrate and at the same time a straight steering mechanism is provided which assists the operator in a well-known manner.

While I have disclosed the rod 37 as connected with an extension 41 of one of the yokes 29, it will be obvious that instead of employing this type of connection a connection such as shown in Figure 4 may be employed. In this figure the rod 37ª which corresponds to the rod 37 is shown as extended adjacent one of the spindle arms 13. Upon this spindle arm is arranged a clamping yoke 50 having an arm 51 directed toward the tube in which the rod 37ª operates. The end of this arm is provided with a transverse slot 52 in which a pin 53 secured to the arm operates. The slot being elongated permits variation of the effective distance between the axle and the arm and at the same time a connection between the rod 37ª and the spindle arm is provided which insures longitudinal movement of the rod corresponding to the operation of the spindle arm 13. The clamping yoke 50 may be adjusted longitudinally of the spindle arm to vary the amount of longitudinal movement which is imparted to the rod 37ª. Many corresponding changes being possible throughout the construction hereinbefore set forth without in any manner departing from the spirit of my invention, I do not limit myself to such specific structure except as hereinafter claimed.

I claim:—

1. In combination with a vehicle including a reciprocating tie rod connected with the steering wheels thereof for controlling the same, a meter for indicating the position of the steering wheels, means carried by said rod operating said steering meter and acting to resist movement of the rod to either side of the position thereof in which the wheels of the vehicle are directed for straight ahead travel of the vehicle, including a lever pivoted at one end to said tie rod and at its opposite end to a stationary portion of the vehicle and disposed in one position when the wheels of the vehicle are positioned for straight ahead travel of the vehicle, springs each connected at one end to the lever and at opposite sides thereof, connections for the opposite ends of the springs whereby one spring resists movement of the lever to either side of such position, and a Bowden wire connection between the lever and meter for operating the same.

2. In operating mechanism for a meter for indicating the position of the steering wheels of a vehicle and in combination with a normal part of the vehicle shifted longitudinally to change the position of the steering wheels, a yoke clamped to said member, a lever pivoted upon the yoke for rocking movement, a Bowden wire connected to the lever to be rotated thereby upon rocking movement of the lever, the opposite ends of the Bowden wire being connected with the meter, a connection between the lever and a stationary part of the vehicle causing rocking movement of the lever when said member is shifted longitudinally, and springs connected at one end to said lever at points spaced from the pivot thereof and at opposite sides of the lever and at their opposite ends to said longitudinally shiftable member at points spaced from said yoke and at opposite sides of the lever.

3. In operating mechanism for a meter for indicating the position of the steering wheels of a vehicle and in combination with a normal part of the vehicle shifted longitudinally to change the position of the steering wheels, a yoke clamped to said member and having a slot extending longitudinally of the member, a lever having one end mounted in the slot, a tube rotatable within the yoke and extending into the slot and through the lever, a Bowden wire housing connected at one end to the tube and at its opposite end to the meter, a Bowden wire within the housing connected with the indicating element of the meter at one end and at its opposite end extending into said tube, a securing element extending through the lever and into the tube and clamping the Bowden wire in position within the tube, and a connection between the opposite end of the lever and a stationary part of the vehicle causing rocking movement of the lever when said member is shifted longitudinally.

4. In operating mechanism for a meter for indicating the position of the steering wheels of a vehicle and in combination with a normal part of the vehicle shifted longitudinally to change the position of the steering wheels, a yoke clamped to said member and having a slot extending longitudinally of the member, a lever having one end mounted in the slot, a tube rotatable within the yoke and extending into the slot and through the lever, a Bowden wire housing connected at one end to the tube and at its opposite end to the meter, a Bowden wire within the housing connected with the indicating element of the meter at one end and at its opposite end extending into said tube, a securing element extending through the lever and into the tube and clamping the Bowden wire in position within the tube, a connection between the opposite end of the lever and a stationary part of the vehicle causing rocking movement of the lever when said member is shifted longitudinally, springs each having one end thereof connected to the lever at opposite sides thereof, and connections between the opposite ends of the springs and said member at opposite sides of said yoke and at points spaced longitudinally of the member therefrom.

5. In combination with a steering meter including a pointer pivoted intermediate its ends for rocking movement, a dial with which one end of the meter pointer coacts, an operative connection between the meter pointer at the pivot thereof and the steering wheels of the vehicle for rocking the pointer upon shifting of the steering wheels of the vehicle to which the meter is applied, and a second operative connection between the steering wheels and the other end of the meter pointer for likewise rocking the meter and in the same direction with the first named connection upon operation of the steering wheels.

In testimony whereof I hereunto affix my signature.

GERHARD VINNEMEIER.